United States Patent
Guerra et al.

(10) Patent No.: US 12,075,308 B1
(45) Date of Patent: Aug. 27, 2024

(54) SYSTEMS AND METHODS FOR CONTACTLESS COMMUNICATION

(71) Applicant: United Services Automobile Association (USAA), San Antonio, TX (US)

(72) Inventors: Oscar Guerra, San Antonio, TX (US); Gregory David Hansen, Fuquay Varina, NC (US); Anto Chirayil Thomas, Coppell, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 317 days.

(21) Appl. No.: 17/486,184

(22) Filed: Sep. 27, 2021

Related U.S. Application Data

(60) Provisional application No. 63/084,376, filed on Sep. 28, 2020.

(51) Int. Cl.
*H04W 4/02* (2018.01)
*H04N 7/15* (2006.01)
*H04W 4/38* (2018.01)
*H04W 4/90* (2018.01)

(52) U.S. Cl.
CPC .............. *H04W 4/023* (2013.01); *H04N 7/15* (2013.01); *H04W 4/38* (2018.02); *H04W 4/90* (2018.02)

(58) Field of Classification Search
CPC ......... H04W 4/023; H04W 4/38; H04W 4/90; H04N 7/15
USPC ...................................................... 455/456.2
See application file for complete search history.

(56) References Cited

U.S. PATENT DOCUMENTS

| | | | | |
|---|---|---|---|---|
| 2013/0079034 A1* | 3/2013 | Taylor | ..................... | H04W 4/02 |
| | | | | 455/456.2 |
| 2016/0182707 A1* | 6/2016 | Gabel | ..................... | G06Q 10/10 |
| | | | | 455/404.2 |

FOREIGN PATENT DOCUMENTS

EP        3133842 A1 *    2/2017   ........... G01S 5/0289

OTHER PUBLICATIONS

Mey, N. D. Welcome To the Low Touch Economy—Board Of Innovation. Board of Innovation. http://www.lowtoucheconomy.com/; (May 4, 2021).

* cited by examiner

*Primary Examiner* — Ted M Wang
(74) *Attorney, Agent, or Firm* — Fletcher Yoder, P.C.

(57) ABSTRACT

A first mobile device exchanges information or documentation with a second mobile device after a vehicular incident or collision has occurred. Communication is initiated or triggered based on detection of the incident by a collision detection system and/or based on the first mobile device contactlessly receiving a user identifier from the second mobile device. The contactless communication may be initiated by a service provider system or by the first mobile device. The first mobile device may include a sensor that scans a user identifier associated with the second mobile device. Then, the first mobile device may transmit the user identifier to the service provider system, which initiates or provides a communication channel between the first mobile device and the second mobile device.

20 Claims, 3 Drawing Sheets

SYSTEMS AND METHODS FOR CONTACTLESS COMMUNICATION

CROSS-REFERENCE TO RELATED APPLICATION

This application claims the benefit of and priority to U.S. Provisional Patent Application No. 63/084,376, entitled "SYSTEMS AND METHODS FOR CONTACTLESS COMMUNICATION", filed Sep. 28, 2020, which is herein incorporated by reference in its entirety.

BACKGROUND

The present disclosure relates generally to systems and methods for contactless communication. More specifically, the present disclosure relates to providing information, documentation, and/or communication between parties involved in a vehicular collision.

Unfortunately, vehicular collisions are not an uncommon occurrence. After vehicular collisions, the involved individuals or parties may exit their vehicles and physically exchange insurance and/or contact information. For example, one individual may stand in close proximity to another individual to discuss the collision and provide their personal cellular phone number to the other individual. However, exchanging information in this manner may pose certain privacy or personal health risks (e.g., increasing the likelihood of passing on a virus).

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

SUMMARY

Figure 1:
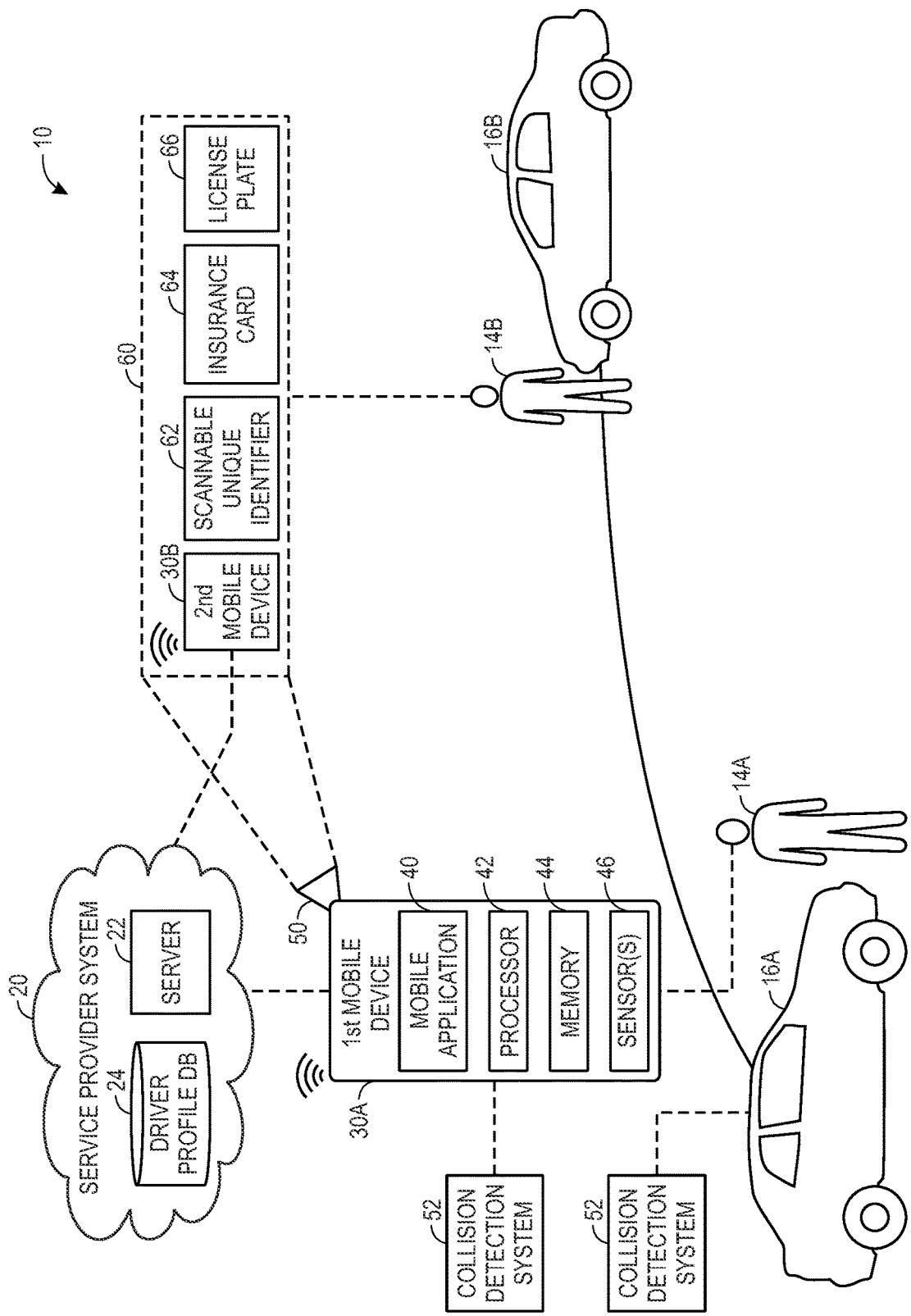
FIG. 1 is a schematic diagram of a contactless communication system that establishes contactless communication between parties of a vehicular collision, in accordance with embodiments described herein.

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

A first mobile device may exchange information or documentation with a second mobile device after a vehicular incident or collision has occurred, without the traditional close-proximity exchange of physical papers or personal contact information. As detailed herein, communication may be initiated or triggered based on detection of the incident by a collision detection system (e.g., of a mobile application on the first mobile device, of the first vehicle) and/or based on the first mobile device contactlessly receiving a user identifier from the second mobile device. Further, the contactless communication may be initiated either by a service provider system or by the first mobile device. The first mobile device may include a sensor (e.g., image sensor, wireless scanner) that scans a user identifier (e.g., mobile device, insurance card, license plate, Quick Response (QR) code) associated with the second mobile device. Then, the first mobile device may transmit the user identifier to the service provider system of a contactless communication system, which initiates or provides a communication channel between the first mobile device and the second mobile device. Additionally or alternatively, the collision detection system may determine that a collision has occurred and provide an indication to the mobile application of the first mobile device, which initiates communication with the second mobile device directly.

In an embodiment, a first mobile device of a contactless communication system includes one or more processors, and one or more memory devices storing a service provider mobile application. When executed by the one or more processors, the service provider mobile application causes the one or more processors to: receive data indicative of a vehicular collision, identify a second mobile device within a threshold distance of the first mobile device, transmit a request for contactless communication to the second mobile device, receive confirmation of the request for the contactless communication from the second mobile device, and initiate the contactless communication with the second mobile device.

In an embodiment, one or more non-transitory, computer-readable media having computer-readable instructions that, when executed by one or more processors, cause the one or more processors to: scan, via a service provider mobile application associated with a first user, for a user identifier associated with a second user involved in a vehicular collision with the first user; in response to scanning the user identifier, transmit data indicative of the user identifier to a server associated with the service provider mobile application; and based on a response from the server, initiate contactless communication with a mobile device associated with the second user.

In an embodiment, a method includes receiving, via a sensor of a first electronic device, user identifier data associated with a second electronic device. Additionally, the method includes transmitting data indicative of the user identifier data associated with the second electronic device and incident data to a server of a service provider system. Further, the method includes initiating contactless communication with the second electronic device based on the user identifier data associated with the second electronic device and the incident data.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure relates generally to contactless communication systems and methods for facilitating communications between individuals or parties involved in a vehicular collision without requiring physical contact. More specifically, the present disclosure is directed to enabling a first user having a first mobile device and a first vehicle to exchange information or documentation with a second user having a second mobile device and a second vehicle in the aftermath of a vehicular collision, without the traditional close-proximity exchange of physical papers or personal contact information. As detailed herein, the communication may be initiated or triggered based on detection of a collision by a collision detection system (e.g., of a mobile application on the first mobile device, of the first vehicle) and/or based on the first user contactlessly receiving a user identifier from the second user. Further, the contactless communication may be initiated either by a service provider system or by the first mobile device. As one example, the first mobile device may include a sensor (e.g., image sensor, wireless scanner) that scans a user identifier (e.g., mobile device, insurance card, license plate, Quick Response (QR) code) of the second user. Then, the first mobile device may transmit the user identifier to the service provider system of a contactless communication system, which initiates or provides a communication channel between the first mobile device and the second mobile device. Additionally or alternatively, the collision detection system may determine that a collision has occurred and provide an indication to the mobile application of the first mobile device, which initiates communication with the second mobile device directly. The term "mobile application" may refer to a software application that is stored and/or executed on a mobile device. As discussed herein, the contactless communication system includes multiple features that facilitate the secured communications between involved parties, without compromising personal privacy or personal health. Additional details regarding the contactless communication system and various methods for operating the contactless communication system will be described below with reference to FIGS. 1-4.

By way of introduction, FIG. 1 illustrates a schematic diagram of a contactless communication system 10 that may be used to facilitate communication or information exchange between two or more individuals 14 involved in a collision of vehicles 16. For example, a first individual 14A possessing a first vehicle 16A may desire to communicate with a second individual 14B that possesses a second vehicle 16B, such as after physical contact inadvertently occurs between the first vehicle 16A and the second vehicle 16B. To provide secure and touch-free communications between the individuals 14, the presently disclosed contactless communication system 10 includes a service provider system 20 that may include a server 22 (e.g., having a communication controller) and a driver profile database 24. As noted herein, the server 22 may include any suitable processors, memories, and/or storage components that facilitate the present techniques. The driver profile database 24 may be or store any suitable data structure (e.g., table) or combination of data structures that associates particular individuals with information of interest, such as their corresponding insurance provider, insurance identification number, coverage type, personal contact information (e.g., phone number, email address, residence address), user identifiers, and so forth.

In an embodiment, the service provider system 20 is a cloud-based system that electronically communicates with any suitable number of mobile devices 30 (e.g., smart phones, smart watches, tablets, laptops, computing devices), such as a first mobile device 30A of the first individual 14A and a second mobile device 30B of the second individual 14B. That is, the service provider system 20 is communicatively coupled to the first mobile device 30A and the second mobile device 30B (e.g., via any suitable communication network, such as the Internet). Moreover, it should be understood that the contactless communication system 10 discussed herein may be extended to facilitate communication between more than two individuals 14, such as in situations in which more than two individuals 14 are involved in a vehicular collision. Further, it should be understood that the contactless communication system 10 may communicatively connect mobile devices 30 that are associated with a same or different service providers. For example, in embodiments in which the first individual 14A purchases insurance coverage from a first service provider associated with the service provider system 20 and the second individual 14B purchases insurance coverage from a different service provider, the service provider system 20 may electronically communicate with any suitable different service provider system associated with the different service provider to facilitate the present techniques.

The first mobile device 30A may include a mobile application 40 (e.g., service provider mobile application) that is generally a service-provider-specific program and facilitates access to various features and information of the service provider. Indeed, the mobile application 40 may include a specific contact-limiting communication module that the first individual 14A may access to remotely communicate with other individuals in the aftermath of a vehicular collision. In an embodiment, the second mobile device 30B also includes the mobile application 40, though it should be understood that the present techniques may facilitate communication between any suitable number of mobile devices 30 that each may or may not store and/or execute the mobile application 40. That is, in some embodiments, as described below, the disclosed techniques may be practiced by the mobile application 40 executing on the first mobile device 30A and communicating with the second mobile device 30B, where the second mobile device 30B may not store or execute a corresponding mobile application 40.

Moreover, the first mobile device 30A may include a processor 42 and a memory 44. The processor 42 may be any type of suitable computer processor or microprocessor capable of executing computer-executable code. Additionally, the processor 42 may also include multiple processors that may perform the operations described herein. The memory 44 may be any one or more suitable articles of manufacture that can serve as media to store processor-executable code, data, or the like. These articles of manufacture may represent non-transitory, computer-readable media, such as any suitable form of memory or storage which may store the processor-executable code used by the processor 42 to perform the presently disclosed techniques.

The memory 44 may also be used to store data, various other software applications, and the like. For example, the memory 44 may store the processor-executable code used by the processor 42 to perform various techniques described herein, as well as code for other techniques as well. It should be noted that non-transitory merely indicates that the media is tangible and not a signal. Accordingly, the processor 42 may execute the mobile application 40, which is stored within the memory 44, and the mobile application 40 may cause a suitable user interface to be displayed on a display of the first mobile device 30A.

Further, the first mobile device 30A includes at least one sensor 46 that facilitates detection of vehicular collisions, detection of the second vehicle 16B, and/or detection of a presence of the second mobile device 30B. As non-limiting examples, the sensors 46 may include one or more of a global positioning system (GPS) sensor, a motion sensor, an accelerometer, a gyroscope, a Bluetooth® transmitter and/or receiver, a radio frequency sensor, an image sensor 50 (e.g., camera), and so forth. In some embodiments, the sensors 46 and/or the image sensor 50 may be external to and communicatively coupled to the first mobile device 30A. For example, the image sensor 50 may include a vehicle mounted camera, such as a dash camera, that enables the first mobile device 30A to receive captured image data and determine whether the captured image data indicates that a vehicular collision has occurred and/or that the second vehicle 16B is within a threshold proximity.

In an embodiment, the first mobile device 30A and/or the first vehicle 16A may also include a collision detection system 52. For example, the collision detection system 52 may be part of the first vehicle 16A may include or be communicatively coupled to one or more sensors of the first vehicle 16A, including one or more motion sensors (such as accelerometers and/or gyroscopes), one or more impact force sensors (such as one or more load cells, strain gauges, and/or force-sensing resistor), and/or one or more audio sensors (such as a microphone that generate signals indicative of the collision). In another example, the collision detection system 52 may be part of the first mobile device 30A, and be communicatively coupled to the sensors 46 and/or the image sensor 50. However, it should be understood that, in some embodiments, the collision detection systems 52 may be omitted, and the sensors 46 of the first mobile device 30A may operate to enable the first mobile device 30A and/or the service provider system 20 to detect that the vehicular collision has occurred.

The first mobile device 30A may enable the first individual 14A to use the sensors 46 to contactlessly exchange information with the second individual 14B. For example, the second individual 14B may possess multiple devices or components that serve as user identifiers 60 interpretable by the first mobile device 30A. As examples, in an embodiment, the sensors 46 of the first mobile device 30A may include Bluetooth® scanning components (e.g., transmitting and/or receiving circuitry) that identify that the second mobile device 30B is within a threshold distance of the first mobile device 30A. Indeed, the first mobile device 30A may electronically detect the presence of the second mobile device 30B in any suitable manner to enable the first mobile device 30A to communicate insurance information with the second mobile device 30B. As particular examples, the mobile application 40 of the first mobile device 30A may provide a text message, an email, a push notification within the mobile application 40 of the second mobile device 30B (if present on the second mobile device 30B) indicating that the first individual 14A is requesting direct communication with the second individual 14B, or the like, which the second individual 14B may accept.

Prior to initiation of substantial communications with the second mobile device 30B or as an integral step of detecting and/or communicating with the second mobile device 30B, the first mobile device 30A may determine that the second mobile device 30A is also indicating that a collision has likely occurred. For example, the first mobile device 30A may detect that the second mobile device 30B is in a threshold range and also has data that indicates that the second mobile device 30B was likely in a collision. In this way, mobile devices in a vicinity of the first mobile device 30A that were not in an collision (or at least do not have data indicating a collision occurred) can be overlooked, at least in an initial pass (e.g., an initial search for available mobile devices), to more quickly identify mobile devices such as the second mobile device 30B. This can improve processing efficiency and computer operations by focusing on more relevant mobile devices when numerous mobile devices are accessible and within range. If an error has occurred or some other reason prevents the second mobile device 30B from indicating that a collision has likely occurred (and in which it was involved), a further pass may allow the first mobile device 30A to contact the second mobile device 30B and confirm that communication regarding the collision is appropriate, which may be followed with the contactless communication described herein.

In another embodiment, the sensors 46 of the first mobile device 30A include the image sensor 50 that captures image data of a scannable unique identifier 62, such as a QR code, that is uniquely associated with the second individual 14B (e.g., including driver's license information, insurance information). The scannable unique identifier may be printed on paper, attached to a windshield of the second vehicle 16B, or displayed on a display of the second mobile device 30B. In additional or alternative embodiments, the image sensor 50 collects image data of an insurance card 64 associated with the second individual 14B, from which the first mobile device 30A may extract text or numeral information (e.g., using text or pattern recognition techniques) as suitable insurance data. In a further embodiment, the image sensor 50 may collect image data of a license plate 66 of the second vehicle 16B, thereby serving as another potential user identifier 60. Indeed, it should be understood that, in certain embodiments, any suitable number (e.g., threshold number) of the user identifiers 60 may be used by the first mobile device 30A to facilitate proper identification of the second individual 14B. Moreover, because the second mobile device 30B may not include the mobile application 40, scanning or otherwise capturing the scannable unique identifier 62, the insurance card 64, and/or the license plate 66 as the user identifier 60 may enable initiation of efficient communication via the mobile application 40 of the first mobile device 30A.

Accordingly, and as discussed below, the contactless communication system 10 disclosed herein may trigger contactless communication in response to the first mobile device 30A receiving a suitable user identifier 60 from the second individual 14B and/or in response to the first mobile device 30A detecting or receiving an indication that a vehicular collision has occurred. Then, either a client-based action or a server-based action may be performed to communicatively couple the first individual 14A and the second individual 14B to exchange information related to the vehicular collision, without relying on the traditional hand-to-hand or close-proximity exchange of insurance information.

As a non-limiting example, the individuals 14 may each have the mobile application 40 on their mobile device 30 that identifies a collision has likely occurred and that another mobile device 30 is within a threshold distance. As initiated by the mobile application 40 by opening an in-application text portal, teleconference, or the like, the individuals 14 may then be able to communicate with one another, without requiring an exchange of phone numbers. Further, upon confirmation at one or both of the mobile applications 40, relevant insurance data may be exchanged between the individuals 14. In another example, the scannable unique identifier 62 (e.g., QR version of an insurance card) may be displayed on a display of the second mobile device 30B for the first mobile device 30A to scan. Once scanned, the first mobile device 30A may provide data indicative of the scannable unique identifier 62 to the server 22, which queries the driver profile database 24 based on the data to retrieve the relevant insurance data associated with the second individual 14B. The relevant insurance data may include, for example, driver's license and insurance information, while the mobile devices 30 may also connect to a conference call for socially distanced discussion. When interactions such as this occur, the service provider system 20 may be notified and relevant information regarding the vehicular collision (e.g., time, date, location) may be recorded for insurance claim purposes (e.g., automatic form completion). Further, notice may be provided as to whether any of the involved individuals 14 have been previously involved in a vehicular collision. Using such information, the insurance provider associated with the service provider system 20 may be guided as to how to efficiently to reach out to the involved parties.

In another embodiment, a detected accident can prompt an immediate wireless communication (e.g., via any suitable wireless communication protocol, such as a wireless local area network (WLAN), Bluetooth®, Wi-Fi, Wi-Fi Direct) search for the other individual 14 to facilitate a touchless interaction. This communication process may first confirm that the other individual 14 was recently in a detected accident in approximately the same location (e.g., within a threshold distance). In certain embodiments, the process may also request entry of the license plates 66 of the related vehicles 16 as a security check before telecommunications are able to be initiated between the individuals 14, as discussed herein. This secure communication process may protect the privacy of the individuals 14 involved, such as by leveraging the license plates 66 to verify that the proper individuals 14 are targeted for communications, and by limiting the transmission of personal contact information or communication avenues to parties that are involved in the vehicular collision. In an embodiment, the communication process may also utilize the service provider(s) of the individuals 14 as secure proxied communicators. For example, the initial call may be transmitted to the relevant service provider or insurance company, which directs the call to the other involved individual 14. In this manner, the individuals 14 will advantageously appreciate that the call is coming from a recognized telephone number associated with a secure entity, thereby causing the individuals 14 to be more likely to answer the calls than if initiated from an unknown telephone number.

Present embodiments may provide contactless communication between targeted individuals 14 based on a technologically-rooted solution to address privacy concerns (e.g., limiting exchange of personal information) and public health issues (e.g., limiting close interpersonal contact) traditionally present after accidental vehicular collisions. Indeed, present embodiments improve traditional post-collision exchanges by providing contact-free communication with individuals 14, without compromising appropriate social distancing and without comprising the integrity of insurance information exchanged between the individuals 14. That is, the individuals 14 may communicate at a distance and through their mobile devices 30 to properly identify one another (e.g., via user identifiers 60) and exchange insurance information. In some embodiments, the mobile application 40 of the first mobile device 30A (and potentially the mobile application 40 of the second mobile device 30B) operates in conjunction with the server 22 of the service provider system 20 to permit selection of at least one remote and secure communication process (e.g., conference call, texting, emailing, messaging within the mobile applications 40). In this manner, the personal contact information of the individuals 14 may be protected, while communications may proceed at a safe, threshold distance having a reduced likelihood to pass on airborne viruses or diseases. It should also be noted that having the various sensing mechanisms (e.g., sensors 46, image sensor 50) integrated with the same first mobile device 30A that is hosting the mobile application 40 improves functionality for computing by increasing communication efficiency and decreasing latency.

Figure 2:
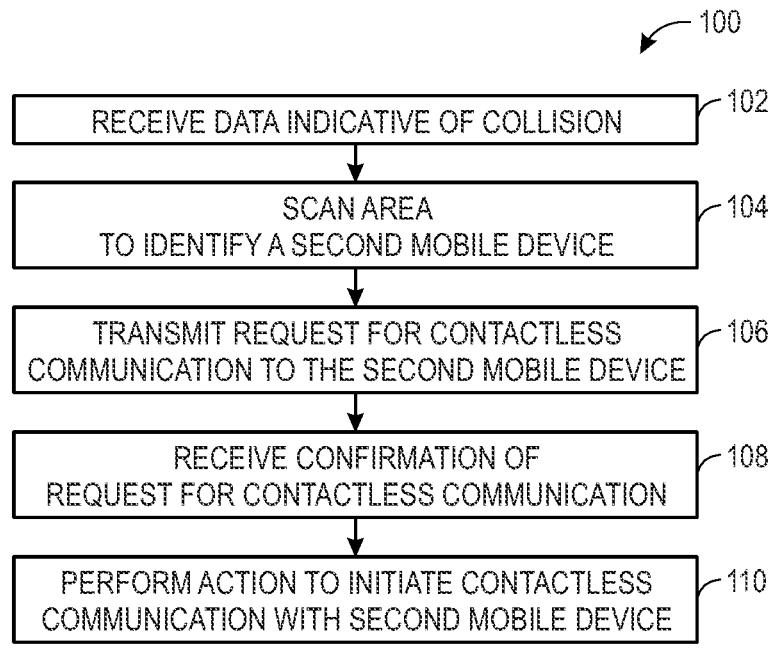
FIG. 2 is a flow chart of a method for contactless communication that is triggered in response to a detected collision, in accordance with embodiments described herein.

With the above general information in mind, FIG. 2 is a flow chart of a method 100 for contactless communication that is triggered in response to a detected collision, in accordance with embodiments described herein. Although the following description of the method 100 is described in a particular order, which represents a particular embodiment, it should be noted that the method 100 may be performed in any suitable order or certain steps may be skipped altogether. Moreover, although the following description of the method 100 is described as being performed by the first mobile device 30A (and in particular, the processor 42), it should be noted that the method 100 may be partially or wholly performed by any suitable computing device or system, such as the second mobile device 30B, the server 22, and the like.

Referring now to FIG. 2, at block 102, the first mobile device 30A (e.g., via the processor 42) receives data indicative of a vehicular collision. The data may be received from the sensors 46 (e.g., GPS, accelerometer, camera, image sensor 50) of the first mobile device 30A, which may entirely or partially form the collision detection system 52 of certain embodiments. In an embodiment, the data includes image data from a dash camera of the first vehicle 16A, which is communicatively coupled to the first mobile device 30A. In another embodiment, the data may be received from the dedicated collision detection system 52 coupled to the first vehicle 16A. Moreover, in some embodiments, the first mobile device 30A receives and correlates the data indicative of the vehicular collision from multiple sources, thereby improving an accuracy in the associated determination that the vehicular collision has occurred.

In response to receiving the data indicative of the collision, the first mobile device 30A performing the method 100 scans, at block 104, the associated area to identify the second mobile device 30B. For example, the first mobile device 30A may perform wireless communication scanning (e.g., via wireless local area network (WLAN), Bluetooth®, Wi-Fi, Wi-Fi Direct) to identify that the second mobile device 30B is within a threshold distance (e.g., 1 meter, 5 meters, 10 meters, 20 meters, 25 meters, 50 meters) of the first mobile device 30A. At block 106, the first mobile device 30A transmits a request for contactless communication to the identified second mobile device 30B. For example, the request may include a device identifier that is unique to the second mobile device 30B and detected during block 104 of the method 100. The second mobile device 30B may receive the request from the first mobile device 30A and, in response, display an indication of the request (e.g., for viewing by the second individual 14B). In response to the second individual 14B providing input to the second mobile device 30B indicative of confirmation or approval of the request, the second mobile device 30B transmits the confirmation of the request for contactless communication to the first mobile device 30A, which the first mobile device 30A receives at block 108.

Accordingly, with the appropriate individuals 14 having confirmed that communication is desirable, the first mobile device 30A performs, at block 110, an action to initiate the contactless communication with the second mobile device 30B. However, in certain embodiments, rather than transmitting the confirmation of the request for contactless communication to the first mobile device 30A, the second individual 14B may directly initiate the communication, if desired. As examples of client-based actions performed by the mobile application 40 of at least one of the mobile devices 30 that initiate communication, a text communication portal may be opened, a teleconference may be initiated, a short messaging service (SMS) communication may be initiated (e.g., with or without a masking proxy), a communication window may be opened between mobile applications 40 of the mobile devices 30, and so forth. As examples of server-based actions performed by the server 22 that initiate communication, the first mobile device 30A may transmit data indicative of the user identifiers 60 to the server 22, which queries the driver profile database 24 to receive contact information of the second individual 14B. Then, the server 22 may provide a secure teleconference, a proxied SMS exchange, and so forth. In certain embodiments, the action performed at block 110 may include reporting incident data to the appropriate service providers and/or authorities (e.g., police, medical providers), thereby expediting processing of the vehicular collision. It should also be understood that the first mobile device 30A may identify and communicate with multiple mobile devices 30 (including the second mobile devices 30B), such as in situations in which the vehicular collision includes more than two vehicles 16.

Figure 3:
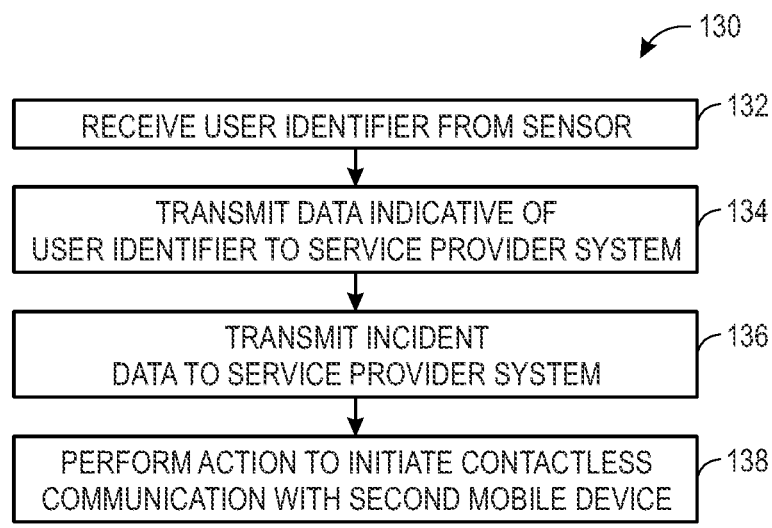
FIG. 3 is a flow chart of a method for contactless communication that is triggered in response to receiving a user identifier, in accordance with embodiments described herein.

FIG. 3 is a flow chart of a method 130 for contactless communication that is triggered in response to receiving a suitable one of the user identifiers 60, in accordance with embodiments described herein. Although the following description of the method 130 is described in a particular order, which represents a particular embodiment, it should be noted that the method 130 may be performed in any suitable order or certain steps may be skipped altogether. Moreover, although the following description of the method 130 is described as being performed by the first mobile device 30A (and in particular, the processor 42), it should be noted that the method 130 may be partially or wholly performed by any suitable computing device or system, such as the second mobile device 30B, the server 22, and the like.

Referring now to FIG. 3, at block 132, the first mobile device 30A (e.g., processor 42) receives at least one of the user identifiers 60 from the sensors 46 and/or image sensor 50. For example, in an embodiment, the first mobile device 30A may directly communicate with the second mobile device 30B (e.g., via sensors 46, Bluetooth® scanning components, transmitting and/or receiving circuitry) to receive user identifying information therefrom. In another embodiment, the first mobile device 30A may use the image sensor 50 to scan the scannable unique identifier 62 to receive the user identifying information. As discussed above, the second individual 14B may present the scannable unique identifier 62 on a display of the second mobile device 30B, on paper, on a dashboard of the second vehicle 16B, and so forth. Further, certain embodiments enable the image sensor 50 of the first mobile device 30A to collect the user identifying information from the insurance card 64 and/or license plate 66. In certain cases, the information from the insurance card 64 and/or the license plate 66 may by entered (e.g., typed) into the mobile application 40 by the first individual 14A.

At block 134, the first mobile device 30A transmits data indicative of the user identifier 60 to the service provider system 20 (e.g., the server 22). As such, the server 22 may query the driver profile database 24 to retrieve contact information and/or insurance information for the second user 14B (e.g., which may be used to initiate or establish contactless communication between the first mobile device 30A and the second mobile device 30B). In some cases, it should be understood that the server 22 may also determine that the second user 14B is associated with a service provider distinct from the service provider system 20, and may subsequently communicate with the distinct service provider to perform the present techniques.

Additionally, at block 136, the first mobile device 30A may transmit (e.g., automatically transmit) incident data regarding the vehicular collision to the service provider system 20, thereby automatically populating at least a portion of a claim form. Indeed, the incident data may include a time of the accidental vehicular collision, a location of the collision (e.g., as determined via the GPS of the first mobile device 30A), any collected image data of the collision, a listing of involved parties, a preliminary analysis of vehicular damage and/or injuries, and so forth. The service provider system 20 may therefore be rapidly informed of the occurrence and details of the incident, such that any requested police or medical professionals may be immediately dispatched.

Based on the user identifier 60 and any received instructions from the service provider system 20, the first mobile device 30A may perform, at block 138, an action to initiate contactless communication with the second mobile device 30B. Indeed, as discussed above with reference to block 110 of FIG. 2, the action may be any suitable client-based action or server-based action that facilitates efficient communication between the individuals 14.

Figure 4:
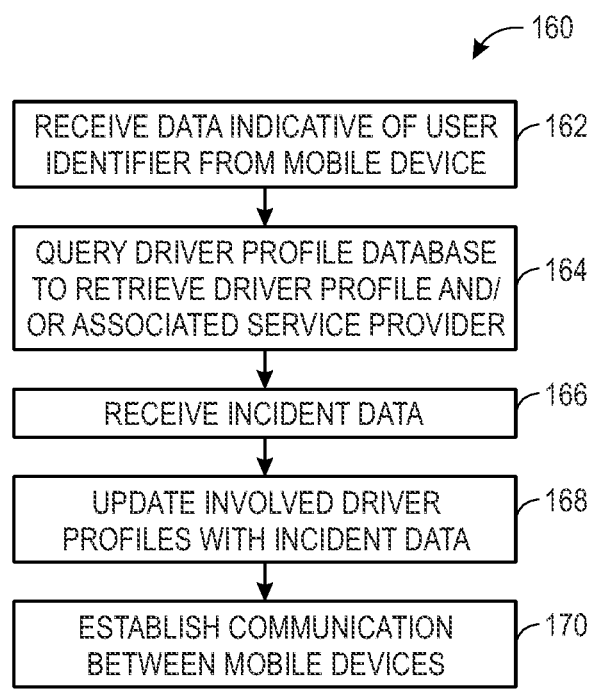
FIG. 4 is a flow chart of a method for a service provider system to establish contactless communication between mobile devices, in accordance with embodiments described herein.

FIG. 4 is a flow chart of a method 160 for a service to establish contactless communication between mobile devices for operating the server 22 of the service provider system 20 to establish contactless communication between the mobile devices 30, in accordance with embodiments described herein. Although the following description of the method 160 is described in a particular order, which represents a particular embodiment, it should be noted that the method 160 may be performed in any suitable order or certain steps may be skipped altogether. Moreover, although the following description of the method 160 is described as being performed by the server 22, which as noted above, includes any suitable processors, it should be noted that the method 160 may be partially or wholly performed by any suitable computing device or system, such as the first mobile device 30A, the second mobile device 30B, and the like.

Referring now to FIG. 4, at block 162, the server 22 receives the data indicative of the user identifier 60 from the first mobile device 30A. As discussed above with reference to block 134 of FIG. 3, the server 22 may receive any suitable combination of data indicative of one or more user identifiers 60 from the first mobile device 30A, which collects the data from the second individual 14B and/or the user identifiers 60 (e.g., second mobile device 30B, scannable unique identifier 62, insurance card 64, license plate 66). In some embodiments, data indicative of at least two user identifiers 60 is requested by the server 22 to confirm or verify the identity of the second individual 14 (such as data indicative of the insurance card 64 and the license plate 66), thereby limiting false or improper identification of the second individual 14B.

At block 164, the server 22 queries the driver profile database 24 to retrieve a driver profile and/or associated service provider of the second individual 14B associated with the user identifier 60. As mentioned above with respect to block 134 of FIG. 3, the server 22 may utilize the data indicative of the one or more user identifiers 60 to query the driver profile database 24. In some embodiments in which the second individual 14B is insured by a different service provider than the first individual 14A, the server 22 may communicate with the different service provider identified in the query, which may provide an associated driver profile of the second individual 14B to facilitate the present techniques.

At block 166, the server 22 may also receive the incident data transmitted to the server by the first mobile device 30A (e.g., as described at block 136 of FIG. 3) to enable the server 22 to populate at least a portion of a claim associated with the vehicular collision. In response to determining, based on the incident data, that particular authority and/or medical providers should be dispatched, the server 22 may also transmit (e.g., automatically transmit) a request to dispatch the particular authority and/or medical providers to the incident location indicated in the incident data. In some embodiments, the individuals 14 are informed of any server-requested dispatches via their mobile devices 30, thereby enabling the individuals 14 to focus their attention on other matters associated with the vehicular collision. Additionally, in certain embodiments, the server 22 updates, at block 168, the involved driver profile(s) within the driver profile database 24 to include the incident data. This updating process therefore enables the driver profile database 24 to remain up-to-date for subsequent reference by the service provider system 20.

Continuing the process 160, the server 22 may establish, at block 170, communication between the mobile devices 30. For example, in response to determining that the individuals 14 are each associated with the same service provider, the server 22 may enable the individuals 14 to communicate through their mobile devices 30 in any suitable manner, such as by providing communication windows within the mobile applications 40 of the mobile devices 30, a teleconference, and/or information that enables a direct phone call, emails, SMS communications, and so forth. Moreover, in response to determining the second individual 14A is associated with another service provider, the server 22 may transmit a communication request to the other service provider, thereby enabling the second individual 14B to receive communication requests from the service provider they are more familiar with and whose phone number they are more likely to readily identify. As such, the server 22 may interoperate with any other service provider systems to enable contactless communication between any involved individuals 14 at the vehicular collision, such as via teleconferences, SMS communications, emails, communication windows within the mobile application(s) 40, and so forth. Further, it should be understood that in situations in which at least two individuals 14 are associated with a same service provider and at least another individual 14 is associated with a different service provider, any suitable combination of communication processes may be performed. For example, the at least two individuals 14 may communicate through the mobile applications 40, while the at least one individual 14 may join the conversation via SMS communications (e.g., either masked or unmasked). Accordingly, the presently disclosed contactless communication system 10 improves social distancing and/or individual privacy, while enabling communication of relevant insurance data regarding a vehicular collision.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A first mobile device of a contactless communication system, comprising:
   one or more processors; and
   one or more memory devices storing a service provider mobile application that, when executed by the one or more processors, causes the one or more processors to:
      receive data indicative of a vehicular collision;
      identify a second mobile device within a threshold distance of the first mobile device;
      transmit a request for contactless communication to the second mobile device, wherein the contactless communication comprises a teleconference implemented at least in part by a server associated with the service provider mobile application;
      receive confirmation of the request for the contactless communication from the second mobile device; and
      initiate the contactless communication with the second mobile device.

2. The first mobile device of claim 1, wherein the service provider mobile application, when executed by the one or more processors, causes the one or more processors to initiate the contactless communication by transmitting an additional request to open a communication portal to a server associated with the service provider mobile application, wherein the server is configured to invite the first mobile device and the second mobile device to the communication portal.

3. The first mobile device of claim 2, wherein the communication portal is presented within a user interface of the service provider mobile application.

4. The first mobile device of claim 1, comprising a sensor, wherein the data indicative of the vehicular collision is received from the sensor.

5. The first mobile device of claim 4, wherein the sensor comprises a location sensor, a motion sensor, an image sensor, or any combination thereof.

6. The first mobile device of claim 1, wherein the service provider mobile application, when executed by the one or more processors, causes the one or more processors to identify the second mobile device within the threshold distance of the first mobile device by detecting that the second mobile device has additional data indicative of the vehicular collision.

7. The first mobile device of claim 1, wherein the one or more processors are configured to scan for a user identifier associated with a user of the second mobile device.

8. One or more non-transitory, computer-readable media having computer-readable instructions that, when executed by one or more processors, cause the one or more processors to:
- scan, via a service provider mobile application associated with a first user, for a user identifier associated with a second user involved in a vehicular collision with the first user;
- in response to scanning the user identifier, transmit data indicative of the user identifier to a server associated with the service provider mobile application; and
- based on a response from the server, initiate contactless communication with a mobile device associated with the second user.

9. The one or more non-transitory, computer-readable media of claim 8, the contactless communication comprises joining a service-provider-initiated teleconference channel with the mobile device.

10. The one or more non-transitory, computer-readable media of claim 8, wherein the contactless communication comprises receiving a cellular number associated with the mobile device.

11. The one or more non-transitory, computer-readable media of claim 8, wherein the user identifier comprises a QR code, an insurance card, a license plate, or any combination thereof, associated with the second user.

12. The one or more non-transitory, computer-readable media of claim 8, wherein the user identifier comprises an identifier of the mobile device that is configured to be scanned via a wireless communication protocol.

13. The one or more non-transitory, computer-readable media of claim 8, wherein the computer-readable instructions, when executed by one or more processors, cause the one or more processors to scan, via the service provider mobile application associated with the first user, for the user identifier associated with the second user involved in the vehicular collision with the first user by scanning for data from local mobile devices within a threshold range that indicates a likely collision has occurred.

14. A method, comprising:
- receiving, via a sensor of a first electronic device, user identifier data associated with a second electronic device;
- transmitting data indicative of the user identifier data associated with the second electronic device and incident data to a server of a service provider system thereby causing the server to populate at least a portion of a claim form; and
- initiating contactless communication with the second electronic device based on the user identifier data associated with the second electronic device and the incident data.

15. The method of claim 14, wherein the incident data comprises a time of an incident, a location of the incident, collected image data of the incident, a listing of parties of the incident, a preliminary analysis of vehicular damage associated with the incident, a preliminary analysis of injuries associated with the incident, or any combination thereof.

16. The method of claim 14, wherein the server is configured to retrieve contact information, insurance information, or both, associated with the second electronic device from a driver profile database.

17. The method of claim 15, wherein initiating the contactless communication with the second electronic device is based on the contact information, the insurance information, or both.

18. The method of claim 14, wherein the sensor comprises an image sensor, and receiving the user identifier data associated with the second electronic device comprises scanning, via the image sensor, the user identifier data from a display of the second electronic device, a piece of paper, a dashboard of a vehicle, or any combination thereof.

19. The method of claim 18, comprising transmitting the user identifier data to a server of a service provider system.

20. The method of claim 14, wherein the sensor comprises an image sensor, and receiving the user identifier data associated with the second electronic device comprises scanning, via the image sensor, the user identifier data from an insurance card, a license plate of a vehicle, or both.

* * * * *